Aug. 19, 1969

G. MOSVOLD

3,461,829

SYSTEM AND APPARATUS FOR CONNECTING AND
STEERING PUSHED VESSELS

Filed June 9, 1967

INVENTOR
GORDON MOSVOLD

BY Stevens, Davis, Miller & Mosher
ATTORNEYS

Aug. 19, 1969

G. MOSVOLD

3,461,829

SYSTEM AND APPARATUS FOR CONNECTING AND
STEERING PUSHED VESSELS

Filed June 9, 1967

INVENTOR

GORDON MOSVOLD

BY Stevens, Davis, Miller & Mosher
ATTORNEYS

United States Patent Office 3,461,829
Patented Aug. 19, 1969

3,461,829
SYSTEM AND APPARATUS FOR CONNECTING
AND STEERING PUSHED VESSELS
Gordon Mosvold, Freeport, Bahamas, assignor, by mesne assignments, to Ocean Research and Manufacturing Company, Inc., a corporation of Florida
Filed June 9, 1967, Ser. No. 644,984
Int. Cl. B63b 21/04, 21/16, 21/56
U.S. Cl. 114—235                           20 Claims

ABSTRACT OF THE DISCLOSURE

A system and apparatus for connecting and steering pushed vessels, particularly in rough seas, by attachment to the stern of the pushed vessel the bow of a pushing vessel, the attachment being a universal coupling means providing for three degrees of motion between the vessels, namely pitch, roll and yaw, and securing cables from the pushed vessel outboard of the coupling operatively connected to the pushing vessel in a manner so as to reduce cable stress and so they can be payed in or out to control positively the steering of the pushed vessel under all sea conditions while under way.

---

This invention finds particular use in the field of marine conveyance, particularly in ocean movement of a pushed vessel where stresses, steering and control by the pushing vessel are of prime importance.

In the movement of pushed vessels, it is necessary for the pushed vessel to be secured to the pushing vessel in an efficient and simplified manner while still retaining the maximum degree of control so that steering can be accomplished in a safe and easy manner particularly under conditions of rough sea.

In the prior art systems, one of these systems provides the pushed vessel with a notched stern to allow the pushing vessel to enter its bow into it so that cables leading from the stern of the pushed vessel and controlled on the pushing vessel permit steering of the pushed vessel. In this system the bow of the pushing vessel rides up and down in the notch thereby lessening the control between the vessels and producing wear, hull stresses and uncomfortable motion particularly in rough seas. In another system, the pushing vessel's bow is butted against a flat fender or plate projecting from the pushed vessel and in like manner, the bow of the pushing vessel is permitted to ride up and down. In other systems where various rigs of rail and pipe providing the connections between bow and stern are employed, the complexity of the connections inhibits the simplicity of control and coupling and thus prevents smooth functioning of the three degrees of motion necessary for rough sea under-way conditions.

The present invention contemplates a simplified system for connecting and steering pushed vessels or barges by having the bow of the pushing vessel or tugboat operatively connected by a universal coupling means positioned in the common centerline of the vessels and between them to provide, in a fixed area between the vessels, a connection so that the pitch, roll and yaw can be simultaneously accommodated during under-way movement of the vessels while still maintaining the bow and stern in their coupled relationship as the vessels accommodate for changes in their displacement in the sea.

The universal coupling means of the system of this invention is provided with coupling components that are vertically adjustable one to the other so that coupling alignment can be made in a quick and easy manner and accommodate for variations in stern height due to the load displacement of the barge by the load it contains.

Also, the system of this invention is provided with two connecting means which may be in the form of securing or tensioning cables both anchored at one end to the barge, one on each side, by a locking means and when cables are used each one is lead through a vertically adjustable eyelet on the stern of the barge to a securing and tensioning means on the tugboat. The securing and tensioning means anchor each cable on the tugboat so that one cable can be payed out and the other taken in to adjust for the angling of the tugboat with respect to its bow connection when the tugboat is operating to effect the turning of the barge. When in forward motion and using tensioning cables, the tensioning cables which are then of equal length from eyelets to securing and tensioning means serve as steadying members to keep the barge and tugboat in their fixed relationship and to dampen the effects of sea action on the vessels. The effective cable length between tugboat and barge is varied by paying in and paying out of the cables under control of the securing and tensioning means which can extend and retract the cables to adjustably accommodate for difference in their length from eyelet to securing and tensioning means as the position of the tugboat is angled with respect to its bow position coupled to the stern of the barge. It will be appreciated that the cooperation of the adjustable coupling for proper bow and stern alignment of the two vessels, the vertical adjustment of the two eyelets to secure the cables in their best functioning position, the extendable cable securing and tensioning means, and the fixed connection between the vessels with three simultaneous degrees of movement, namely pitch, roll and yaw, allow for a universally adjustable system that can accomplish coupling and steering of vessels in a simple and easy manner and in various types of sea conditions.

Advantageously a first portion of the coupling means is mounted on the tug boat bow while the mating portion of the coupling is mounted on the stern of the barge extending out therefrom so that the vessels are well separated when the portions of the coupling are engaged. A vertical trackway means is mounted centrally on the stern of the barge to provide means for adjustment of the position of the portion of the coupling which is adapted to engage the portion of the coupling mounted in the bow of the tugboat and to center the stern portion of the coupling means so that when the bow is coupled to the stern, the vessels have a common centerline. The trackway means allows for vertical adjustment of the stern portion of the coupling so that it can be vertically aligned with the portion of the coupling in the bow of the tugboat when the two vessels are to be connected or are connected during operation. After the alignment is made, the stern coupling portion is made fast to the trackway and then becomes a fixed unit.

Advantageously, the coupling means may be in the form of a ball and socket arrangement with the ball coupling portion extending outward from the stern of the barge and adjustable in line with the socket portion of the coupling in the bow of the tugboat so that the vessels can automatically be coupled together by the movement of the bow of the tugboat up to the position of the ball portion on the stern of the barge. This is accomplished by a socket jaw and seat arrangement, the jaws of which are capable of being opened to receive the ball portion of the coupling, and when the ball is in the socket seat, the jaws are closed, encasing a large portion of the ball to form the universal coupling means. Coupling can be effected automatically by pressure engagement of the ball portion of the coupling means when the socket portion is in open position, and then automatically locking the ball portion in the socket portion by the utilization of hydraulic and/or pneumatic means. This system allows for coupling and uncoupling of the vessels by remote control, thus making the operation safe and efficient.

It will be appreciated that the universal coupling means may be formed so that it has a series of three pinned joints in which rotatable motion is provided about $x$, $y$, and $z$ axes thus providing three degrees of motion as is present in the ball and socket coupling described above. In this type of coupling each degree of motion is about a separate axis with all axes being in a confined area.

Advantageously, each tensioning cable may be provided with one or more cable lug, stop, or fitting means positioned in the length of it so that changes in the cable distance between an eyelet and a securing and tensioning means or the cable attaching means can be rapidly changed by securing the desired stop on the cable in the securing and tensioning means as various positions of angularity of the tugboat with respect to the barge is made. Thus, the series of stop means on each cable allows one cable to be lengthened while the other is shortened as the tugboat is brought into angular position to effect turning of the barge. Apart from using the tugboat rudder, the angle between the vessels can be changed for steering purposes in relatively large increments using the cable stops, while smaller changes in this angle can be made by using the securing and tensioning means which is the control means for the cables to pay out or take in the cable.

The foregoing objects and advantages of the invention will be more fully understood when read in light of the accompanying description and drawings presenting preferred embodiments, which are only by way of illustration of the inventive concepts herein, and not as limitations thereof, and in which:

Figure 1:
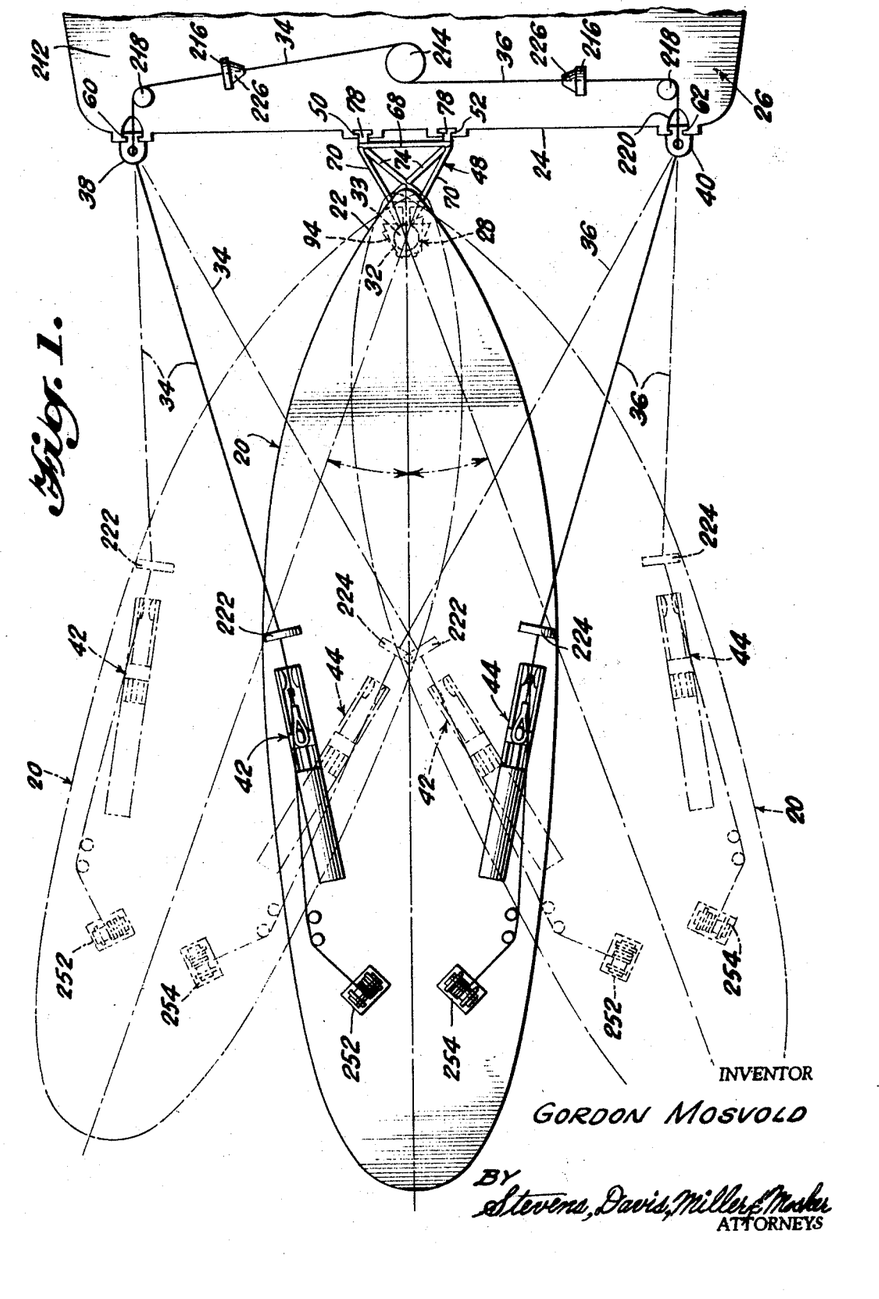
FIGURE 1 is a plan view of a tugboat coupled "in-line" to the stern of a barge, showing the position of the tensioning cables and in broken lines the tugboat in various positions at an angle to the barge to effect forward motion and steering.

Referring to the drawings, a pushing tugboat 20 is shown releasably coupled by a connection at its bow 22 with the stern 24 of a material-carrying barge 26. The tugboat and the barge are connected by means of a ball and socket type universal coupling means 28 which provides an in-line thrust through the coupling means along a line substantially parallel to the longtudinal centerline of the vessels. The ball and socket coupling means 28 has its female element or socket portion 32 mounted in the tugboat bow and the male element or ball portion 33 mounted to the barge stern so that, when coupled together, the ball portion can swivel in the socket portion to provide a universal type movement in substantially a fixed area so as to provide compensation for roll, pitch, and yaw between the vessels. Thus, during pushing, the vessels can swivel about, at a fixed distance of separation, at the area of coupling as sea motion between vessels occurs or the horizontal angle between the vessels is changed in steering. Port and starboard securing and tensioning cables 34 and 36 located outboard of the coupling means 28 extend between coupling points of attachment on the two vessels and extend between a pair of port and starboard cable eyelets or cable locating and guide means 38 and 40, which operate as cable restraining or tension points at the barge stern, and a pair of port and starboard cable attaching means 42 and 44 positioned on the tugboat weather deck, which provide the points of attachment, cable length adjustment, and cable tension points on the tugboat (see FIGURE 1).

The ball portion 33 of the coupling means is mounted on the barge 26 by a support means or truss 48 which extends aft of the barge stern separating the vessels when they are coupled together. The truss is securely retained by and is vertically slidable at the barge stern in a pair of vertical truss trackways 50 and 52 positioned so as to transmit centrally of the barge stern thrust tension and sidewise directed forces acting between the two vessels and so that the height of the ball portion 33 can be vertically adjusted to be in line with the socket portion 32 in those cases where different loads require such adjustments. It will be seen that the spaced eyelets 38 and 40 on the stern of the barge are supported and vertically movable along eyelet trackways 60 and 62, respectively, at port and starboard sides of the barge stern to provide for adjustment so that they can be positioned vertically and substantially in line with the horizontal plane of the coupling means. It will be appreciated that any conventional type of cable, screw or hydraulic lifter or pushing means may be used to lower or raise either the eyelets or the truss so as to adjust and position them as desired.

The truss 48 is strongly formed from a base square 68 to the respective corners of which four tubular struts 70 are welded at one of their ends, the other ends of the struts being welded to respective corners of a cap square 72 also formed from four welded tubular members. Four cross-braces 74 interbrace the struts with the base square and the cap square. To the cap square is attached, such as by welding, ball support member 76 to which is attached the ball portion 33 which forms the male portion of the coupling means.

Attached to the base square of the truss at its respective corners are four slide shoes 78 which are T-shaped in cross-section. The wings of the "T" cooperate with oppositely disposed grooves of the truss trackways 50 and 52 which are defined by the confronting, spaced lips of the angle rails forming the trackways, and the barge stern, so the shoes are capable of being vertically adjusted therein and retain the truss within the trackway and provide for its vertical adjustment to position the height of the ball portion 33 as desired (see FIGS. 1, 2, and 3).

Figure 5:
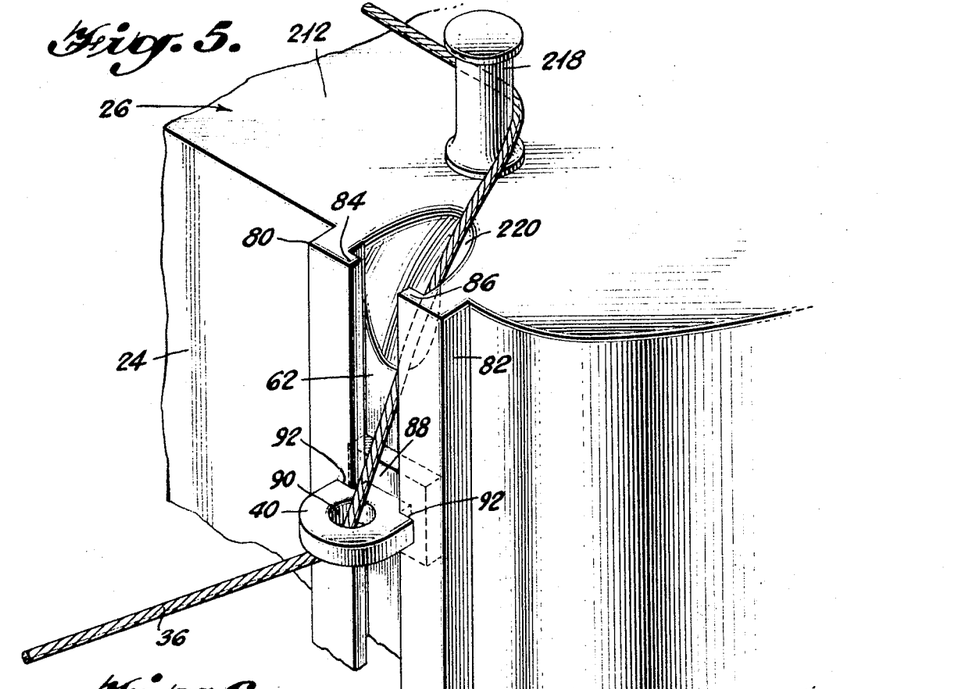
FIGURE 5 is a view in perspective of the after starboard portion of the barge showing one of the cable eyelets adjustably positioned in a trackway at the barge stern.

The eyelet trackways 60 and 62 extend vertically at the barge stern thereby providing means for the retention and positioning of the eyelets through which the cables 34 and 36 pass. Each eyelet trackway is formed from a pair of angle rails 80 and 82 having spaced confronting lips 84, 86 which, together with the barge stern, define opposite grooves for slidably receiving the support shoe 88 which forms the support means for one of the eyelets so it is retained in the trackway when adjusted and fixed in height. Each eyelet has a substantial thickness in the vertical direction which defines an aperture or opening 90 therethrough for receiving and controlling its respective cable. The outer perimeter of the eyelet extends over confronting portions of the lips of the angle rails, and then narrows to a neck joined with the support shoe 88 so that the shoe and the eyelet form between them a pair of oppositely extending notches 92 which engage the rails and which provide additional stability when tension is thrusted upon the eyelet when the steering system is in operation (see FIGURE 5).

The socket portion 32 of the coupling means is recessed into the bow of the tugboat in a locating receptacle 94 which can be closed over with a fairing (not shown) when not in use to provide the tugboat with a clean stem line and also permit the use of a flared bow which is more efficient at sea. The receptacle has a wide mouth 96 and a funneled-in guiding surface 98 leading to a hemispherical socket recess 100 formed in a movable block 102. The block is attached through a buffer rod 104 to a shock-absorbing oleo 106 comprising orificed buffer plate 108 resiliently biased by buffer spring 110 in an oil containing oleo cylinder 112. The oleo provides means to absorb the shock of coupling when the male ball portion 33 is brought home to fully seat against block 102. A pair of oppositely disposed jaws or locking collars 114 and 116, which form with the recess the complete socket portion of the coupling means are reciprocally movable in oppositely arranged collar guides 118 and 120. The collars are connected through collar rods 122 and 124 to locking collar pistons 128 and 130 which ride in locking collar cylinders 132 and 134 so the pistons are biased away from their locking position by retracting springs 136 and 138.

It will be appreciated that when the coupling means is in its open or uncoupled position, the retracting springs 136, 138, and buffer spring 110 act to respectively hold the locking collars 114 and 116 retracted in their guides 118 and 120, and the block 102 at its forward position. Thus open, the locking collar bevels 140 and 142 have their outer edges aligned with inner edges of the guiding surface 96 and the inner edges of the bevels are positioned near edges of the seat or socket recess 100. These parts thus cooperate to form a funnel which acts as a locating and guiding device for smoothly leading the ball into correct position for seating in the recess.

Figure 2:
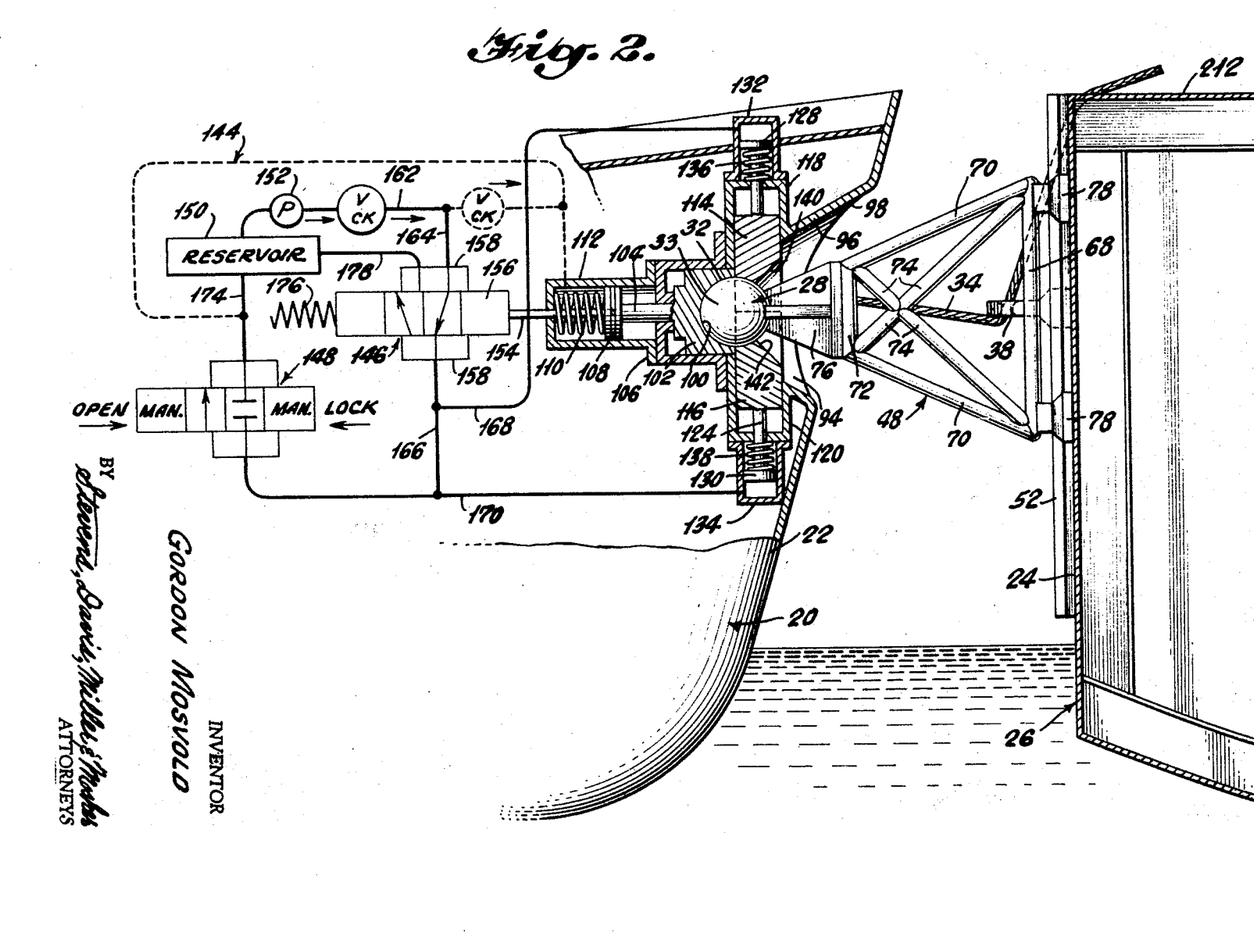
FIGURE 2 is a side view in elevation of the tugboat bow coupled to the stern of the barge, portions of a coupling means being shown in section with a schematic representation of the control means used to effect coupling and uncoupling.

An hydraulic automatic control system for locking together and releasing the coupling means when coupling and uncoupling the vessels is shown schematically in FIGURE 2 and indicated generally by numeral 144. Broadly, the control system includes a relay 146, a control switch 148, an oil supply reservoir 150, pressure supply pump 152, and associated pressure lines which serve to open and close the locking collars 114 and 116 which engage the portion of the ball attached to the ball support member 76. Block 102 defining recess 100 operates rod 104 and plate 108 to move a control system relay rod 154. With the locking collars in open (retracted) position, and the control switch 148 in the "lock" position, on moving together of the tugboat and the barge, ball portion 33 seats in recess 100 moving the block 102 aft in its guide, compressing spring 110 and causing relay rod 154 to move a relay piston 156 to the left in the diagram. This aligns ports in the relay piston and a relay housing 158 so as to pass oil from the oil supply reservoir 150 under pressure produced by supply pump 152, through pressure lines 162 and 164, through the relay to pressure lines 166, 168, and 170, thereby pressurizing the locking collar cylinders 132 and 134, which are oppositely disposed to each other so that the locking collars 114 and 116 under oil pressure are moved inwardly to engage the portion of the ball attached to the ball support. Thus, the locking collars and the block 102 confine the operative portion of the ball to provide for the universal movement in the coupling means.

The coupling means can be opened quickly to uncouple the vessels in operation or in the event of emergency by moving the control switch 148 to "open" position. This starts the release of the oil pressure by first bleeding oil from cylinders 132, 134 through lines 166, 168, and 170, the switch, and line 174 back to the reservoir so that retracting springs 136 and 138 are premitted to move the locking collars outwardly thus releasing the ball portion 33. As the vessels move apart, relay spring 176 can return the relay piston to its fully "open" position thereby completing the release of oil from the locking collar cylinders 132, 134 through line 178 back to the reservoir.

It will be appreciated that the control system set forth above can be modified by conducting oil from the shock-absorbing oleo directly through the relay and to the locking collar cylinders 132, 134 so that oil is supplied to pressurize the cylinder by the inward movement of buffer plate 108 as the ball portion is brought into contact with block 102. This is indicated in broken lines shown in FIGURE 2.

Figure 3:
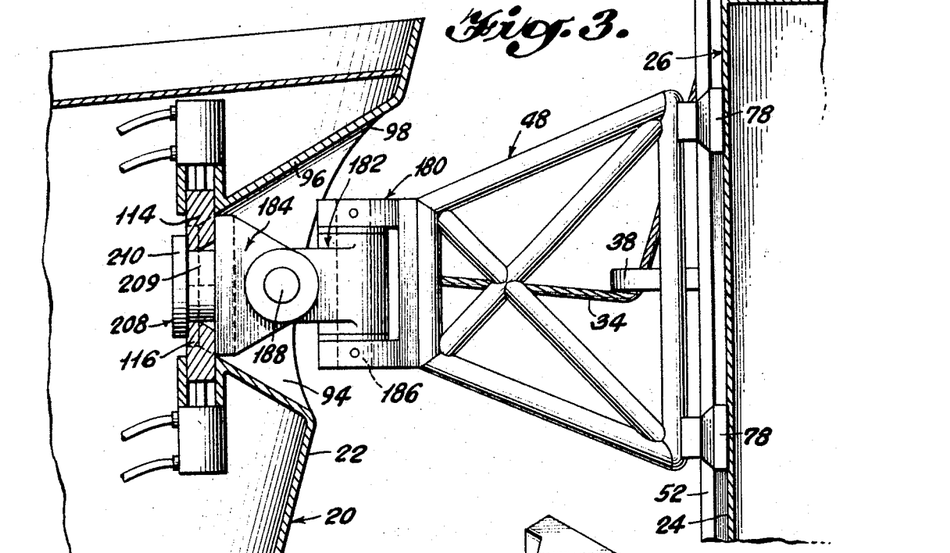
FIGURE 3 is a view in elevation of an alternate coupling means to that shown in FIGURE 2.
Figure 4:
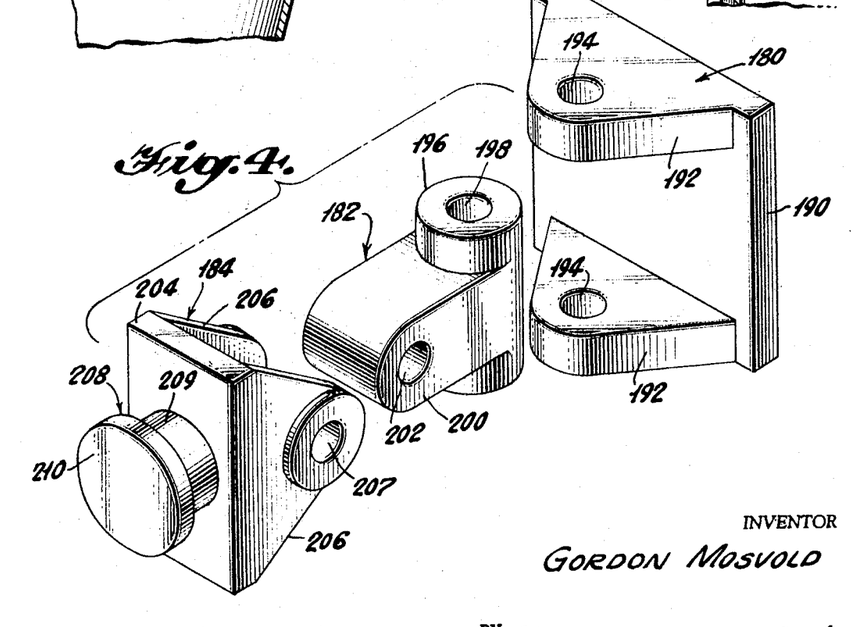
FIGURE 4 is an exploded view in perspective of the portions of the coupling means of FIGURE 3 expanded to show its major functional parts.

An alternate form of a universal coupling means which can be employed in this invention is one which has three associated separate axes of rotation, each axis of rotation providing one of the movements of roll, pitch, and yaw (see FIGURES 3 and 4). This coupling means has three major articulated portions or units 180, 182, and 184, each operatively pivoted together. Units 180 and 182 are connected by pivot pin 186, and units 182 and 184 are connected by pivot pin 188. Unit 180 has a base plate 190 by which it is attached to the truss 48 and a pair of spaced flanges 192 extending at right angles thereto, each defining a hole 194 adapted to receive the pin 186. Unit 182 has a cylindrical portion 196 which defines hole 198 and is of a length to fit between the spaced flanges 192 and receive pin 186 to form a vertical axis of rotation between units 180 and 182. Unit 182 also has an extension member 200 which defines hole 202 adapted to receive pin 188. Operatively connected to unit 182 is a third unit 184 having a base plate 204 and a pair of spaced flanges 206 at right angles to the plate and defining holes 207. Flanges 206 are spaced to receive extension member 200 so that holes 202 and 207 are in line and capable of receiving pin 188 to provide rotation about a horizontal axis. Base plate 204 has a stud type connector 208 having a short shaft member 209 extended horizontally on an axis normal to the axis of pins 186 and 188 and terminating in locking disc member 210 which provides the direct coupling to the bow of the tugboat, and is in the form of a buttom-type boss.

In the bow of the tugboat is a jaw type of female coupling member adapted to receive male stud type connector 208 in a manner heretofore described in the coupling of the ball portion in the socket portion. This female coupling member has locking collars 114 and 116 which are formed to fit around the shaft member between plate 204 and disc member 210, securely coupling the tugboat and barge together. Since shaft 209 is free to rotate in the locking collars, this movement, together with the mvoement afforded around the axes of pins 186 and 188, provides for three degrees of pivoting which can be more particularly described as rotation about the conventional x, y, and z axes of a coordinate system.

The control of the coupled vessels is provided after coupling by the tensioning cables which extend, one on each side, from the barge to the tugboat. On the deck 212 of the barge stern is provided a centrally located winch 214 for carrying the extra cable length or footage needed to extend the cables to the tugboat for connection and to take in the cables when uncoupling is desired. The barge stern also has a spaced pair of cables retaining blocks 216 outboard of the winch to which the cables can be securely attached at the barge, and outboard thereof port and starboard bitts 218 around which the cables are passed for cleanly leading them to the eyelets located in trackways 60 and 62 via the fairleads 220.

As previously stated, at the tugboat weather deck are a pair of port and starboard cable attaching means 42 and 44 which are the control means for the cables and each of these is provided with a large hook 232 for holding the cable to the tugboat and which act as the cable attachment points to cable securing and tensioning means on the tugboat. Roller fairleads 222 and 224 are provided forward of the hook to lead the cables at their tugboat ends smoothly to the cable attaching means.

Each cable is provided at its barge end with a stopper fitting represented by numerals 226 and at the tugboat end with a series of grip fittings 228 spaced along the cable (only one shown). The grip fittings are wire rope or cable eye splices which are fitted to the cables by splicing into them a short leader 230, the free end of which forms the eye splice. When the cables are in their vessel connecting positions, the cable stopper fittings 226 engage the cable retaining blocks 216 and there hold the cables fast to the barge. At the tugboat end of the cables, one of the eye splices forming the series of grip fittings engages the hook 232 and thereby secures the cable to the tugboat. It will be appreciated that both the stopper fittings and the grip fittings can be wire rope or cable eye splices which are fitted to the cables by a leader spliced into the cables or both can be formed from conventional cable stop fittings such as swaged-on collar type fittings or the like and the cable attaching means adapted for engagement and release of such fittings.

Figures 6, 7, 8:
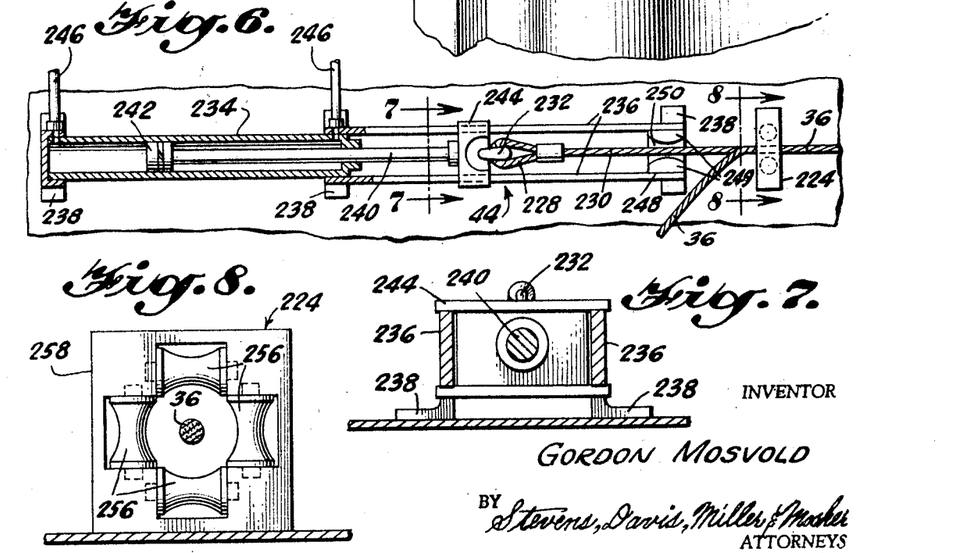
FIGURE 6 is a plan view of one of the securing and tensioning means for attaching the cable and controlling it on the tugboat, showing the cable led through a fairlead and attached to the securing and tensioning means by a leader and grip fitting, and portions of the pneumatic tension cylinder of the securing and tensioning means are shown in cross-section.
FIGURE 7 is an elevational view taken along line 7—7 of FIGURE 6 showing a crosshead and hook arrangement supported on the guide-rails for catching and securing the grip fitting on the cable.
FIGURE 8 is an elevational view taken along line 8—8 of FIGURE 6 showing the fairlead guiding the cable to the securing means on the tugboat.

Only the starboard cable attaching means will be described since both starboard and port means are identical. The starboard cable attaching means includes the pneumatic tension cylinder 234 and a pair of guide rails 236 in longitudinal alignment therewith. Both cylinder and rails are supported on footings 238 which affix the device to the weather deck of the tugboat approximately fore and aft thereof so that the forward end of the device is directed slightly outboard. Through one end of the tension cylinder 234 there is extended a piston rod 240 whose one end attaches to an air actuated piston 242 slidable within the cylinder and whose other end is attached to a crosshead 244 which is slideably supported on the guide rails. The crosshead carries the hook 232 for securing the cables to the tugboat by engagement of one of the grip fittings 228 over the hook.

For control of the cable tension, the air actuated piston 242 is operatively controlled by air under pressure passing through lines 246 from a source not shown. The cylinder can thereby be pressurized to reciprocate the piston and its connected piston rod as desired using manual or automatic control (not shown) of the air pressure to the cylinder. The movement of the piston under constant air pressure provides for keeping the tension on the cables substantially constant by extending or retracting the crosshead and its cable gripping hook 232.

Thus, the cylinder accomplishes two functions: one is to act as a buffering device to absorb unusual stress in the cable, and the other is to pay out and take in cable when steering is desired. When used for steering, one tension cylinder pays out cable at one side of the tugboat while the other tension cylinder takes in cable at the other side. Thus, one cable is lengthened while the other is shortened to make for a simplified and easy operation of the cable for effective steering. The cylinders also provide for paying out and taking in on both sides at the same time when coupling of the vessel is in progress and the eyelets are required to be adjusted in height.

A cable release means 248 is provided at the outboard end of each of the cable attaching means which, together with action of the tension cylinder, provides for rapid disconnection and casting off of the cables from the tugboat and also selective engagement of grip fittings 228. The release means is formed from a pair of fixed jaws 249 supported at the outboard ends of the guide rails and spaced to form between them a tapered narrow throat 250. The throat is sufficiently narrow to catch and hold the eye splice forming the grip fittings 228 but allows portions of the crosshead to pass beneath the jaws and the hook 232 to pass into the throat for release of the grip fitting from the hook. When the crosshead is moved to the release means, the construction provides for release of cable tension from the crosshead and hook and transferring cable tension to the release means which allows the grip fitting to be automatically released from the hook 232. The cable is then held at the tugboat by the jaws so another grip fitting further along the cable can be engaged with the hook or the grip fitting held at the release means can be cast loose from the jaws when it is desired to disengage the cables from the tugboat. When releasing one of the cable grip fittings 228 to take in or pay out cable and attach another grip fitting of those spaced along the cable, the excess cable footage is taken in or payed out at the tugboat by one of the port or starboard tugboat winches 252 or 254.

It will be appreciated that the pneumatic tension cylinders 234 for actuating the securing and tensioning cables as desired during steering can have controlled means to release the air pressure in the cylinder. This will permit in the event of emergency the moving of the crosshead outboard to allow quick disengagement of the grip fitting from hook 232 so that the cables can be cast loose from the tugboat.

When the cable attaching means 42 and 44 are fully fixed in position on the tugboat deck, the port and starboard roller type fairleads 222 and 224, respectively, can be used to smothly lead the cable in and out by means of the rollers 256 journalled for rotation in the pillow block 258 of the fairleads (see FIGURE 8).

Figure 9:
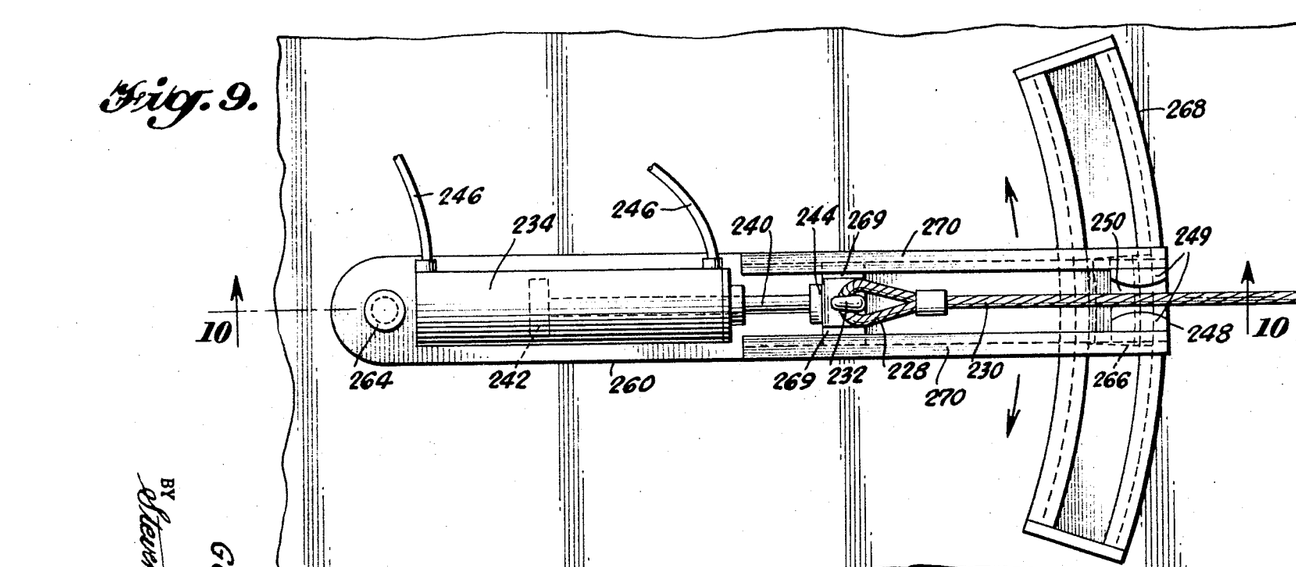
FIGURE 9 is a plan view of a modification of the securing and tensioning means showing a grip fitting engaged on a hook supported by it and pivotable so a fairlead is not needed.
Figure 10:
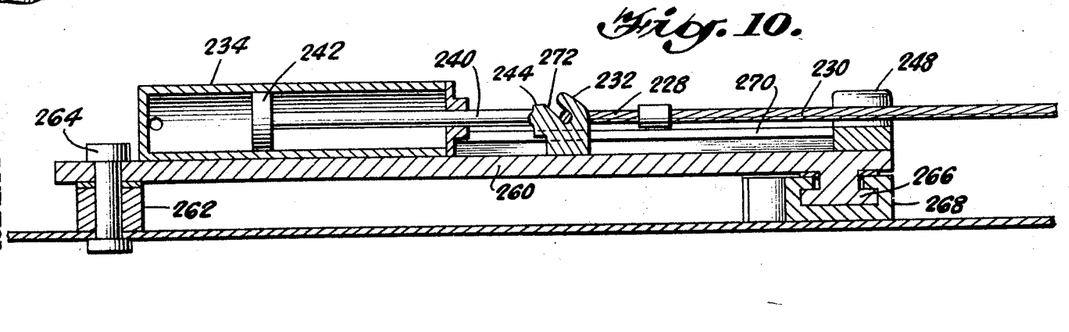
FIGURE 10 is a view in side elevation of the cable attaching device shown in FIGURE 9.

A modification of a cable attaching device is shown in FIGURES 9 and 10. In this modification, the cylinder is supported on a pivotally movable horizontally positioned cylinder pad 260 on the deck of the tugboat which is secured to a pad support 262 by means of pivot bolt 264 so that the outboard end of the cylinder pad can move in an arc about the pivot bolt. Supporting the pad and attached thereto at its outboard end is a depending button 226 which rides in a track formed by arc-shaped channel 268, to guide it.

In this modification, it will be seen that the crosshead is free to slide directly on the cylinder pad and has extending flanges 269 which ride beneath overhanging side rails 270 thereby maintaining the crosshead in line with the cyilnder. Thus, it will be seen that the cable attaching means of this embodiment provides for the securing and tensioning cables to be in line with their respective pivot bolts so that the stress on the cable attaching means is directly transmitted in line with the tension cylinders to make for a strong and efficiently working cable connection device. It will also be seen from this modification that the crosshead 244 has a cam surface 272 so that the eye splice forming the grip fitting can ride up the surface by a cam action so as to be released from the hook when the crosshead moves to the cable release means 248 as heretofore described.

In operation, when coupling the tugboat and barge together using the ball and socket coupling means, the truss 48 on the barge is raised or lowered and fixed in position to place the ball portion in line with the socket portion 32 on the tugboat. The tugboat is operated to maneuver the vessels together so as to position the ball portion 32 within the locating receptacle 94 at the tugboat. The receptacle acts as a locating and guiding recess for the ball portion so that as the vessels are moved further together the ball is guided into the socket portion and slight misalignments are accommodated for by a sliding contact of the ball portion against inner sides of the receptacle moving the vessels somewhat as the ball portion moves inwardly and guiding the ball portion into full alignment with block 102 so the ball portion seats in the socket recess 100. Pressure between the vessel is continued by tugboat operation to move the vessels closer together until the ball portion compresses the spring and buffer plate mechanism of the shock-absorbing oleo 106 by pressure against block 102. As the block moves aft, and with the automatic control system switch 148 in "lock" position, the locking collars are brought into engagement around the ball portion by oil pressure acting against the oppositely positioned locking collar pistons 128 and 130 as heretofore described, thereby coupling together the ball and socket portions of the coupling means which then forms a secure universal joint between the vessels.

In connecting the securing and tensioning cables between barge and tugboat, the eyelets 38 and 40 forming the cable tension points at the barge are adjusted so as to be fixed at approximately the height of the coupling means. Light lines (not shown) are payed out from the take-up winches 252 and 254 on the tugboat and passed to the barge. The ends of the cables 34 and 35 which are stowed on the barge stern for passing to the tugboat are then connected to the lines. The lines are drawn back to the tugboat using the tugboat winches and bringing the tension cables as these are payed out from the barge winch 214 through the eyelets 38 and 40. The cable stopper fittings 226 at the barge ends of the cables are engaged with the cable retaining blocks 216 to securely hold the cables locked to the barge. The crossheads of the port and starboard pneumatic tension cylinders on the tugboat are extended forward and one of the grip fittings 228 along the port and starboard cables at their tugboat ends are engaged with the respective port and starboard cable attaching hooks 232. The tension cylinders are then air pressurized to apply correct tension to the securing cables. The tugboat and barge are thus connected outboard of the coupling means with cables extending between the vessels so opposite end portions of the cables are secured at cable attaching points on the weather decks of the vessels, but frictionally restrained for pivoting intermediate thereof at tension points below the barge deck at its stern so the cables extend approximately horizontally between the vessels at about the height of the coupling means, and cable elongations are accommodated at constant tension by means of the tension cylinders on the tugboat thereby reducing cable failure from stress and elongation in use and providing a more simplified, safe and efficient system of pushing and steering vessels at sea.

In uncoupling the two vessels altogether, the cables are released by first releasing air pressure from the tension cylinders at the tugboat allowing crossheads 244 of each cable attaching means to be extended forwardly. This slacks the cables by moving forward the cable attaching points at the tugboat, which are the hooks 232, until the grip fittings 228 engage the cable release means 248 as above described and provides for letting go of the cables from the tugboat when the grip fittings are disengaged from the release means of the cable attaching means 42 and 44 at the tugboat. It will be appreciated that should the cables be let go at sea as in an emergency, the tugboat ends of the cables are released well forward of the tugboat's propeller and immediately taken up by the barge winch so the cables do not foul the tugboat propeller thereby increasing the safety of at-sea pushing operations. Routinely, after disconnection of the cables from the tugboat, the tugboat ends of the cables are attached to the truss on the barge for easy access in the next vessel coupling operation.

When the cables have been disconnected from their attachment to the tugboat the control switch 148 is moved to "open" position whereby the locking collars 114 and 116, which form the outer part of the socket portion 32 of the coupling means, are moved apart by the action of retracting springs 136 and 138 to open the coupling means and release the ball portion 33 from the socket as heretofore described, and the vessels are then free to separate.

In steering the barge by the tugboat, when the vessels are coupled together, in accordance with the invention, steering may be accomplished with the vessels directly "in line" using only the turning power of the tugboat's rudder. Turning the barge by pushing can also be accomplished in accordance with the invention using the securing and tensioning cables to move and/or maintain the tugboat at an angle with respect to the barge as follows:

If a turn to port is to be executed, the crosshead 244 of the starboard cable attaching means 44 at the tugboat is extended forward by reducing air pressure to one side of the piston in its tension cylinder. This slacks the starboard cable 36 by reducing tension on it as will be apparent from the foregoing and allows the distance between vessels along the starboard tensioning cable to be increased. Pressure is maintained in the tension cylinder at the port cable attaching means 42, causing its crosshead to move aft. This now shortens the distance between the vessels along the port cable and causes the stern of the tugboat to be put to port as far as the slack in the starboard cable will allow. If desired, the stern of the tugboat can be helped to move to port by steering with the tugboat rudder. When the desired steering angle of tugboat to barge is reached, the starboard tension cylinder is repressurized as necessary and pressure held or adjusted in both port and starboard tension cylinders to maintain the tugboat at the desired steering angle with respect to the barge. During this operation, the tugboat's stern can be held in position under control of the tugboat rudder.

Advantageously, automatic control means can be provided to automatically accomplish all of these operations under control of an operator in the tugboat wheelhouse or other control station on the tugboat to provide an efficient, centrally controlled and directed steering and pushing operation directed from the pushing vessel.

In steering, the desired angle the tugboat will make with the barge may be great enough to require lengthening the cable between vessels at one side and shortening the cable length between vessels at the opposite side beyond the effective travel of the tension cylinder crossheads, and thus the reach of the cable attaching hooks 232. When this occurs, it will be appreciated that the series of grip fittings attached along increments of the cables' lengths at the tugboat can be utilized by disengaging one of the grip fittings from the hook and engaging thereto another of the fittings along the cable so as to provide with suitable fore and aft positioning of the cable attaching hooks any degree of turning of the tugboat with the cables to position it at any desired angle to the barge.

In an alternate system for adjusting the cable lengths for steering purposes, it can be advantageous to use clutched winches (not shown) on board the tugboat to take in, pay out and hold the tension cables to the desired lengths extending between the vessels during pushing and steering. This system can provide for an infinitely variable adjustment of the steering angle, which is the angle the pushing vessel makes with the pushed vessel, by selective control of the port and starboard tensioning cable lengths extended between the vessels.

In some cases it can be advantageous to arrange the tensioning cables to have their points of attachment to the barge located at the barge cable tension points as by securing the cables directly to the eyelets. When this arrangement is used, the extra cable length needed for paying out and taking in when steering can be stowed either on the barge or in some cases on the tugboat.

It will be appreciated that in locking the coupling means together the locking mechanism can be modified so that the locking collars 114 and 116 will be spring loaded to couple the vessels together under spring action until the locking collars are mechanically released to open the coupling.

It will be appreciated that the height adjustment of either or both of the adjustable portions of the coupling means and the eyelets can be automatically or manually adjusted and preset after adjustment through the use of pneumatic or hydraulic positioning cylinders, mechanical gears and jackscrews, or cables and winches.

It will be further appreciated that the control system of this invention, in operating the coupling means to both open it for receiving the ball portion and for locking the ball portion to insure a positive function of the means, can be operated hydraulically or pneumatically or by combinations thereof or can be operated by any other suitable mechanical means electrically controlled. Also, the eyelets which may be in the horizontal plane of the coupling can also be positioned in a vertical plane of the coupling normal to the centerline of the pushed vessel so that the eyelets are in line with the coupling member along the horizontal axis passing through the center of the coupling. Also, the securing and tensioning cables of this invention can be taken in or released by varying the air pressure to the piston.

It will be obvious to those skilled in the art that various changes and modifications may be made in the embodiments presented herein without departing from the spirit and scope of the invention.

What is claimed is:

1. An apparatus for coupling together a pushing vessel and a pushed vessel and for steering the coupled pushed vessel, comprising a universal, thrust coupling means having one portion of it fixed on one vessel and the other portion fixed on the other vessel, said coupling means operatively connecting the stern of the pushed vessel with the bow of the pushing vessel and providing three degrees of motion between the vessels to accommodate simultaneously for pitch, roll and yaw and means for vertically bringing into alignment the portions of the coupling means so as to compensate for a differential in vertical height between the vessels during coupling in the common centerline of the vessels; two locking means on the stern of said pushed vessel located outboard and on each side of said coupling means; two securing and tensioning means, one positioned on each side of said pushing vessel; and two connecting means extending between the vessels, one on each side, fastened at one end to said locking means and at the other end operatively connected to said securing and tensioning means, said securing the tensioning means adapted to maintain the vessel under connected control when said pushing vessel is angled with respect to the common centerline of the vessels.

2. The apparatus of claim 1 in which said coupling means provides for automatic coupling of said vessels when the said pushing vessel is brought in line with the common centerline of the vessels and its bow to the stern of said pushed vessel.

3. The apparatus of claim 2 in which the stern of said pushed vessel has mounted thereon one portion of said automatic coupling means and the bow of said pushing vessel has the other portion of said automatic coupling means mounted on it, whereby bringing the bow of the pushing vessel to the stern of the pushed vessels provides for automatic coupling of said vessels.

4. The apparatus of claim 3 in which one of said portions of the automatic coupling means is surrounded by a lead-in funnel whereby the other portion of said automatic coupling means is guided into locking engagement when the bow and stern are brought together.

5. The apparatus of claim 2 in which said coupling means is provided with a male portion extending from the stern of said pushed vessel and a female portion in the bow of said pushing vessel, said female portion having locking jaws that are biased open for receiving said male portion and biased closed after said male portion has made contact with it.

6. The apparatus of claim 5 in which the female portion of said coupling means has contact means therein for operatively actuating said jaws of said female portion when the male portion of said coupling means pushes against said female portion during the coupling operation.

7. The apparatus of claim 3 in which the portion of the automatic coupling means on the stern of the pushed vessel is a projecting ball member and the other portion of the automatic coupling means on the bow of the pushing vessel is a jaw socket member having biased jaws for receiving a substantial portion of the ball member and and then closing the jaws around it to make a ball and socket coupling means that provides three degrees of motion to accommodate simultaneously for pitch, roll, and yaw of the coupled vessels.

8. The apparatus of claim 3 in which the portion of the automatic coupling means on the stern of the pushed vessel is a series of three articulated pivoting units projecting from the stern of the pushed vessel and providing separate pivoting about $x$, $y$ and $z$ axes as exemplified by a rectangular coordinate system, the furthermost extending unit having a button-type boss, and the other portion of the automatic coupling means on the bow of the pushing vessel in the form of a socket means having biased jaws for receiving the button-type boss to provide the axis of rotation when the jaws are biased closed about said button-type boss to provide three degrees of motion to accommodate simultaneously for pitch, roll and yaw of the coupled vessels.

9. The apparatus of claim 1 in which said cable locking means includes a positioned stop means on said cable which connects a retaining block on the stern of the pushed vessel so that the proper length of cable can be paid out for attaching to the securing and tensioning means on pushing vessel.

10. The apparatus of claim 1 in which said securing and tensioning means are cables and said cables are operatively connected to said locking means.

11. An apparatus for coupling together a pushing vessel and a pushed vessel and for steering the coupled pushed vessel, comprising a universal, thrust coupling means operatively connecting the stern of the pushed vessel with the bow of the pushing vessel, said coupling means providing three degrees of motion to accommodate simultaneously for pitch, roll and yaw and positioned in the common centerline of the vessels; two locking means on the stern of said pushed vessel located outboard and on each side of said coupling means; two securing and tensioning means, one positioned on each side of said pushing vessel; and two connecting means extending between the vessels, one on each side, fastened at one end to said locking means and at the other end operatively connected to said securing and tensioning means, said tensioning means passing through spaced eyelets which are adjustable in height one on each side of the stern of said vessel outboard of said coupling means so that the eyelets can be adjusted to be in substantially the same horizontal plane as the coupling means and said securing and tensioning means adapted to maintain the vessel under connected control when said pushing vessel is angled with respect to the common centerline of the vessels.

12. An apparatus for coupling together a pushing vessel and a pushed vessel and for steering the coupled pushed vessel comprising a universal, thrust coupling means operatively connecting the stern of the pushed vessel with the bow of the pushing vessel, said coupling means providing three degrees of motion to accommodate simultaneously for pitch, roll, and yaw and positioned in the common centerline of the vessels; two locking means on the stern of said pushed vessel located outboard and on each side of said coupling means; two securing and tensioning means, one positioned on each side of said pushing vessel; and two connecting means extending between the vessels, one on each side, fastened at one end to said locking means and at the other end operatively connected to said securing and tensioning means, with each of said securing and tensioning means being pivoted at one end with the other end free to swing in an arc within an arcuate guide track for lining up said cable between said pivot and said locking means on said pushed vessel, and said securing and tensioning means adapted to maintain the vessel under connected control when said pushing vessel is angled with respect to the common centerline of the vessels.

13. An apparatus for coupling together a pushing vessel and a pushed vessel and for steering the coupled pushed vessel comprising a universal, thrust coupling means operatively connecting the stern of the pushed vessel with the bow of the pushing vessel, said coupling means providing three degrees of motion to accommodate simultaneously for pitch, roll, and yaw and positioned in the common centerline of the vessels; two locking means on the stern of said pushed vessel located outboard and on each side of said coupling means; two securing and tensioning means, one positioned on each side of said pushing vessel; and two cables extending between the vessels, one on each side, fastened at one end to said locking means and at the other end operatively connected to said securing and tensioning means, each of said cables are provided with a spaced series of cable stop means along their lengths and cable stop attachment means positioned in said securing and tensioning means adapted to receive one of said cable stops whereby increment lengthening and alternate shortening of the cable lengths between vessels can be achieved as angling of the stern of the pushing vessel with respect to the common centerline of the vessels is made to effect steering of the pushed vessel and said securing and tensioning means adapted to maintain the vessel under connected control when said pushing vessel is angled with respect to the common centerline of the vessels.

14. A system for coupling together a pushing vessel and a pushed vessel and for steering the coupled vessel which comprises effecting a universal coupling of the bow of the pushing vessel with the stern of the pushed vessel, said coupling being in the common centerline of the vessels when bow to stern, vertically aligning the portion of the coupling on the stern of the pushed vessel with the portion of the coupling on the bow of the pushing vessel, leading securing and tensioning cables from both the port and starboard sides of the stern of the pushed vessel through cable locating and guiding means positioned at the stern of the pushed vessel and vertically adjusting them so that when said cables from the barge are passed through the cable locating and guiding means and attached to the pushing vessel said cables are substantially in the horizontal plane of said coupling, and connecting the free end portions of the cables to the respective port and starboard sides of the pushing vessel; locking the cables on the stern of the pushed vessel when the desirable cable length has been passed to the pushing vessel; connecting the cables to securing and tensioning means on the pushing vessel with enough cable length available for lengthening either cable when alternate lengthening and shortening of cable is required to angle the stern of the pushing vessel in respect to the common centerline of the vessels and paying out of one cable and taking in of the other cable to angle the stern of the pushing vessel with respect to the common centerline of the vessels to effect turning of the pushed vessel.

15. A system for coupling together a pushing vessel and a pushed vessel and for steering the coupled vessel which comprises effecting a universal coupling of the bow of the pushing vessel with the stern of the pushed vessel, said coupling being in the common centerline of the vessels when bow to stern, vertically aligning the portion of the coupling on the stern of the pushed vessel with the portion of the coupling on the bow of the pushing vessel, leading securing and tensioning cables from both the port and starboard sides of the stern of the pushed vessel through cable locating and guiding means positioned out from the stern of the pushed vessel and in line with a vertical plane passing through the cable locating and guiding means and the point of coupling of the vessels, and connecting the free end portions of the cables to the respective port and starboard sides of the pushing vessel; locking the cables on the stern of the pushed vessel when the desirable cable length has been passed to the pushing vessel; connecting the cables to securing and tensioning means on the pushing vessel with enough cable length available for lengthening either cable when alternate lengthening and shortening of cable is required to angle the stern of the pushing vessel in respect to the common centerline of the vessels and paying out of one cable and taking in of the other cable to angle the stern of the pushing vessel with respect to the common centerline of the vessels to effect turning of the pushed vessel.

16. The apparatus of claim 11 in which the thrust coupling means forms a connection between the vessels which is vertically adjustable relative to one of the vessels to accommodate in height for changes in load displacement of the pushed vessel relative to the pushing vessel whereby the said tensioning cables can be adjusted so as to be in substantially the same horizontal plane as the coupling means.

17. The apparatus of claim 1 in which the securing and tensioning means on the pushing vessel have tension cylinder means connected to said connection means for elastically buffering operational strains on the connecting means.

18. The apparatus of claim 17 in which said tension cylinder means are pressure controlled to take up slack, provide tension, and to slack the securing and tensioning cables to effect quick attachment of them for control of the coupled vessels.

19. The apparatus of claim 13 in which said cable attachment means is a hook and said cable stop means is an eye splice adapted to receive and be retained by said hook.

20. The apparatus of claim 13 in which said securing and tensioning means is provided with a release means for engagement therewith of the said cable stop means to thereby automatically disattach the cable stop means from said cable attachment means.

References Cited

UNITED STATES PATENTS

| | | | |
|---|---|---|---|
| 843,458 | 2/1907 | Hoos | 114—231 |
| 1,618,401 | 2/1927 | Baer | 114—235.1 |
| 2,431,039 | 11/1947 | Harrison | 114—235.1 |
| 2,870,734 | 1/1959 | Armstrong et al. | 114—236 |
| 2,920,597 | 1/1960 | Dick | 114—230 |
| 2,984,202 | 5/1961 | Lunde | 114—235 |

TRYGVE M. BLIX, Primary Examiner